United States Patent Office 3,049,570
Patented Aug. 14, 1962

3,049,570
EXPLOSIVE COMPOSITION
Charles W. Plummer, Norwell, Mass., assignor, by mesne assignments, to the United States of America as represented by the Secretary of the Navy
No Drawing. Original application Mar. 4, 1957, Ser. No. 643,894. Divided and this application Apr. 16, 1959, Ser. No. 811,771
4 Claims. (Cl. 260—645)

This invention relates to a new and improved process for the preparation of polynitro hydrocarbons. More particularly this invention relates to a process for the preparation of aliphatic and aromatic-aliphatic compounds having a trinitromethyl group and to new and useful compounds prepared by this process.

This application is a division of my copending application, Serial No. 643,894 filed March 4, 1957.

Aliphatic and aromatic-aliphatic nitro compounds are of the greatest interest as a source of high explosive compounds. Of particular interest are the compounds in which there is no hydrogen attached to the carbon atom carrying the nitro group. Such a hydrogen is markedly acidic and is the main source of the chemical instability of many nitroparaffins. In addition compounds of this type have a high oxygen content. The trinitromethyl group alone is calculated to have 40% oxygen in excess of that necessary to burn its carbon to carbon dioxide. It has been recognized that if practical methods could be found for preparing this type of compound an entire new class of explosives would be opened up for exploration.

The introduction of nitro groups into aliphatic hydrocarbons by prolonged reaction with nitric acid has long been known. However, yields achieved by this method are rarely satisfactory. These types of compounds are, therefore, usually obtained by other methods such as the reaction of silver nitrite and alkyl halides or the action of alkali-metal nitrites on halogenated fatty acids. Yields of dinitro products have not been satisfactory utilizing these processes, however, and compounds having a terminal trinitro group are not obtained using these methods.

It is therefore, an object of the present invention to provide a new and useful process for the preparation of polynitro aliphatic and aromatic-aliphatic hydrocarbons.

Another object is to provide a process for the preparation of polynitro paraffins from nitroparaffins.

A further object is to provide a process whereby polynitro alkanes may be prepared from mononitro and dinitro alkanes.

A still further object is to provide a process whereby benzene derivatives having a terminal nitro substituted side chain may be nitrated to the corresponding polynitro derivatives.

Another object is to provide a process whereby polynitro hydrocarbons may be prepared from mononitro and dinitro substituted hydrocarbons through the use of tetranitromethane as a nitrating agent.

Still another object is to provide new and useful polynitro substituted hydrocarbons.

Other objects and the attendant advantages of the invention will become apparent to those skilled in the art as the disclosure is made in the following detailed description.

In accordance with the process of the present invention the starting compound, i.e., the compound to be nitrated, is first mixed with a strong base in solution. Tetranitromethane is then added to the solution and the solution is allowed to stand with agitation until the reaction has been completed. The solution is then drenched in water and the product separated.

The following theory is advanced to explain the reaction described but is not to be considered as a limitation of the scope of the invention.

The presence of the nitro group in a nitroparaffin causes the hydrogen on the α carbon of the molecule to become labile. In this respect aromatic nitro compounds having a terminal nitro group attached to a side chain resemble in their behavior the aliphatic nitro compounds. When dissolved in aqueous alkali all of the above compounds go over into the salt of the iso-form,

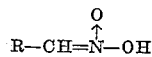

also called the aci-form, according to the following equilibrium:

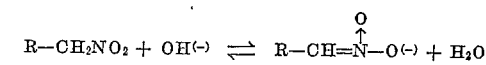

The equilibrium lies well to the right for mono-nitro compounds, and apparently even further to the right when a second nitro group is attached to the α carbon atom. The ion thus formed has been found to be sufficiently stable to react with tetranitromethane in accordance with the following general equation, as illustrated for a 1,1-dinitro compound:

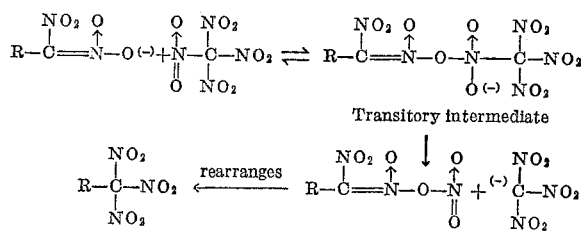

The greater the tendency of the anion to form, the larger is the proportion of the tetranitromethane that undergoes the reaction. In order that the anion will form and remain stable the alkalinity of the solution must be maintained at a high level during the course of the reaction. The more concentrated the anion and the tetranitromethane the more favored will be the nitration.

Any solvent may be used which will dissolve the reactants and intermediate products without entering into the reaction. Preferably the solvent should be one in which the alkali employed retains its basicity to the highest degree possible. Aqueous solutions of methanol have been found best suited for this purpose. Aqueous solutions of ethanol will also give satisfactory results. Anhydrous methanol and ethanol have also been employed with slightly lower yields.

In order to maintain the alkalinity of the reaction mixture as high as possible a strong base should be employed. Sodium hydroxide has been found suitable for the nitration of 1,1-dinitro alkanes to 1,1,1-trinitro alkanes. Potassium hydroxide may also be used for this purpose but the insolubility of the salts formed using this base has been found to interfere with the reaction. For the nitration of mononitro alkanes to give 1,1,1-trinitro alkanes directly, a stronger base must be employed. Sodium methylate has been employed successfully for this purpose. Sodium methylate has also been employed to prepare trinitro and dinitro substitution products from the nitro substituted alkyl derivatives of benzene.

During the course of the reaction the alkalinity of the mixture gradually decreases. The alkalinity may be maintained at a high level throughout the period of the reaction by stirring in an excess of sodium bicarbonate. This has resulted in increased yields.

Satisfactory yields are obtained where equimolar ratios of starting compound, base and tetranitromethane are employed. The yields may be increased, however, by mixing in an excess of base and tetranitromethane. The use of an excess of tetranitromethane is, however uneconomical and makes the final separation quite difficult.

An analysis of several experiments shows that the reaction time (i.e. that at which the conversion of tetranitromethane to nitroform had almost ceased) was about 22 hours.

The appropriate starting compounds may be prepared as follows:

The starting compounds may be prepared by the reaction between silver nitrite and an alkyl halide. In general the method consists in adding as rapidly as possible a 5% excess of silver nitrite to a cold solution of the alkyl halide in low boiling petroleum ether, allowing the temperature of the stirred mixture to rise to 40° C. and maintaining this temperature (±3°) until a halide test on the reaction liquor is negative (6–8 hours). The mixture is then filtered, the silver salts washed with petroleum ether and the solvent and most of the low boiling alkyl nitrite removed at reduced pressure. The residue is treated with cold sulfuric acid containing a little urea (to remove any nitrous acid formed) and the resulting solution is poured over ice. Extraction with petroleum ether gives a yellow liquid which is almost pure product. Except for a brown residue the entire solution distills over within a temperature range of one degree or less.

The dinitro compounds may be prepared from the mononitro compounds by reaction with silver nitrate and sodium nitrite in a chilled alkaline mixture of ethyl ether, water, and sodium hydroxide. The dinitro compounds may also be prepared by reaction of the mononitro compounds with tetranitromethane in accordance with the process of the present invention.

After the nitration reaction with tetranitromethane is complete, the products are isolated by diluting the reaction mixture with water and extracting with methylene chloride. Separation of the 1,1-dinitro starting material from the desired trinitro product may be satisfactorily accomplished by precipitating the potassium salt of the 1,1-dinitro alkane from ether and filtering it off. After washing with water and drying, the ether may be removed and the resulting oil taken up in methylene chloride and passed through an activated alumina column. In this way, the neutral product passes through and may then be purified by distillation.

Table I lists some of the physical properties of the new and useful trinitro alkanes prepared utilizing the process of this invention.

Table II lists some of the physical properties of the new and useful dinitro and trinitro alkyl substitution products of benzene prepared utilizing the process of this invention.

TABLE II 1,1-DINITRO-3-PHENYLPROPANE

| | C, percent | H, percent | N, percent | M.P., °C. |
|---|---|---|---|---|
| Theoretical | 51.43 | 4.80 | 13.33 | |
| Found | 51.52 | 4.68 | 13.38 | 37.5–38.5 |
| | 51.40 | 4.89 | 13.32 | |

1,1,1-TRINITRO-3-PHENYLPROPANE

| | C, percent | H, percent | N, percent | M.P., °C. |
|---|---|---|---|---|
| Theoretical | 42.36 | 3.56 | 16.47 | |
| Found | 42.75 | 3.58 | 16.39 | 35.5–36.5 |
| | 42.91 | 3.55 | 16.23 | |

The process of this invention may best be understood by reference to the following examples which are disclosed by way of illustration and are not to be considered as limiting the invention. The procedure outlined is believed to be the best but may be varied somewhat as long as the reaction between the tetranitromethane and the aciform radical in an alkaline solution is not interfered with. Addition of the tetranitromethane to the starting compound prior to the addition of the base does not appear to affect the reaction to any detectable degree.

EXAMPLE I

To a chilled, stirred solution of 7.5 g. (0.10 M) of nitroethane in 150 ml. of methyl alcohol contained in a 500 ml. Erlenmeyer flask was added dropwise 77.5 ml. of 2.58 N methanolic solution of sodium methylate. To the clear colorless solution chilled in an ice bath was added 39.2 g. (0.20 M) of tetranitromethane at such a rate that the temperature of the exothermic reaction did not rise above 10° C. The resulting orange solution was allowed to stand four days at room temperature. The volume of the solution was reduced to about 125 ml. under reduced pressure and the residual solution poured into 400 ml. of water. Extraction of the colorless, heavy oil with methylene chloride gave 7.70 g. of orange liquid. The crude product was distilled at 34° C. and 1 mm. to give a colorless distillate weighing 6.80 g. which crystalized in the Dry-Ice chilled receiver. At 10° C. a large TABLE I
*Elementary Analysis*

| | Found, percent | Theor., percent | B.P. | F.P., °C. | Density | $N_D$ |
|---|---|---|---|---|---|---|
| $CH_3CH_2C(NO_2)_3$ | C, 20.69<br>H, 3.07<br>N, 22.88 | 20.15<br>2.95<br>23.48 | 23° C. at 2 mm. | −57.7 | 1.3938 at 22° C. | 1.4432 at 22° C. |
| $CH_3CH_2CH_2C(NO_2)_3$ | C, 25.43<br>H, 3.84<br>N, 21.84 | 24.90<br>3.65<br>21.75 | | −23 | 1.3253 at 23° C. | 1.4424 at 23° C. |
| $CH_3$<br>$\phantom{xx}\diagdown$<br>$\phantom{xxx}CH-C(NO_2)_3$<br>$\phantom{xx}\diagup$<br>$CH_3$ | C, 25.00<br>H, 3.69<br>N, 20.93 | 24.90<br>3.65<br>21.75 | 33° C. at .35 mm. | 9.5 | 1.3452 at 23° C. | 1.4436 at 23° C. |
| $CH_3CH_2CH_2CH_2C(NO_2)_3$ | C, 29.60<br>H, 4.21<br>N, 19.79 | 28.99<br>4.38<br>20.29 | 50° C. at .7 mm. | | 1.2740 at 25.5° C. | 1.4438 at 25.5° C. |
| $CH_3$<br>$\phantom{xx}\diagdown$<br>$\phantom{xxx}CHCH_2C(NO_2)_3$<br>$\phantom{xx}\diagup$<br>$CH_3$ | C, 29.63<br>H, 4.22<br>N, 20.11 | 28.99<br>4.38<br>20.29 | 20° C. at 10 mm. | | 1.2743 at 25.5° C. | 1.4443 at 25.5° C. |
| $\phantom{xx}CH_3$<br>$\phantom{xxxx}\vert$<br>$CH_3-C-C(NO_2)_3$<br>$\phantom{xxxx}\vert$<br>$\phantom{xx}CH_3$ | C, 29.42<br>H, 4.58<br>N, 18.85 | 28.99<br>4.38<br>20.29 | M.P. 139–141° C. | | | |
| $CH_3(CH_2)_4C(NO_2)_3$ | C, 34.57<br>H, 5.34<br>N, 16.72 | 32.60<br>4.98<br>19.00 | liquid | | | | part of the distillate had liquified. The liquid part was decanted and the crystals recrystallized from 2½ ml. of n-butanol. The white crystals thus obtained weighed 1.40 g. and had a melting point of 53–55° C. A mixed melting point with authentic 1,1,1-trinitroethane showed no depression. This weight corresponds to an 8.5% yield of trinitroethane from nitroethane. The liquid portion of the distillate was mostly 1,1-dinitroethane. The crude weight of the dinitroethane was 5.40 g. corresponding to a 45% yield from nitroethane.

EXAMPLE II

The reaction was carried out as described for Example I using mole ratios of nitroethane, sodium methylate, and tetranitromethane of 1 to 4 to 4. The weight of the crude product was 16.5 grams. A titration of a sample of this material against standard base showed it to contain about 10 g. of 1,1-dinitroethane (assuming most of the acidity was due to the presence of this compound). This corresponds to an 83% yield of dinitroethane (assuming most of the acidity was due to the presence of this compound). This corresponds to an 83% yield of dinitroethane from nitroethane. No attempt was made to isolate the dinitroethane. The crude product was stirred vigorously for 2.5 hours with an aqueous solution containing twice as much sodium bicarbonate as calculated for the neutralization of the dinitroethane. Extraction with methylene chloride left 8.60 g. of orange oil which, when crystallized from 6 ml. of n-butanol, gave 2.71 g. of white crystalline 1,1,1-trinitroethane having a melting point of 50–53° C. This corresponds to a 16.5% yield of trinitroethane from nitroethane.

EXAMPLE III

To a stirred and chilled solution of 2.40 g. (0.020 M) of 1,1-dinitroethane in 14 ml. of methyl alcohol was added a solution of 0.020 M of sodium hydroxide in 4.0 ml. of water. The resulting yellow solution, having a pH of 8, was stirred for 15 minutes, and then 3.92 g. (0.020 M) of tetranitromethane was added rapidly. The color changed immediately to an orange-red and the pH of the solution dropped to about 7. The solution was allowed to stand at room temperature for 18 hours during which time the pH dropped to about 5. After diluting the solution with 200 ml. of water, the turbid oil which separated was extracted with 3 x 10 ml. of methylene chloride. The extract was washed with water and dried over sodium sulfate. Removal of the solvent at 20 mm. left 2.70 g. of a yellow oil which had a very strong odor of tetranitromethane. The crude product was crystallized from 2 ml. of n-butanol to give 1.16 g. of white crystals; M.P. 49°–52°. A mixed M.P. with authentic 1,1,1-trinitroethane showed no depression. The yield of 1,1,1-trinitroethane was 35%.

EXAMPLE IV

To a stirred and chilled solution of 26.8 g. (0.20 M) of 1,1-dinitropropane in 200 ml. of methyl alcohol was added dropwise a solution of 8.0 g. (0.20 M) of sodium hydroxide in 50 ml. of water over a ten minute period. To the resulting cold yellow solution, with continued stirring was added 39.2 g. (0.20 M) of tetranitromethane in one minute. The solution darkened to a deep orange-red color and its pH was 7. The solution was allowed to stand at room temperature for two days during which time the color had lightened to an orange shade and the pH had dropped to about 5. After diluting the solution with 1250 ml. of water, the insoluble oil was extracted with 3 x 100 ml. of methylene chloride. The extract was washed with 4 x 50 ml. of saturated sodium chloride solution and dried over sodium sulfate. Removal of the solvent under reduced pressure left 32.0 g. of acidic yellow liquid which smelled strongly of tetranitromethane. After keeping this oil at room temperature at 0.35 mm. for 4 hours, there was left 24.5 g. of acidic oil which contained only a small amount of unreacted tetranitromethane. A titration showed the presence of about 9 g. of unchanged dinitropropane in this oil, assuming that the acidity was due mainly to this compound. On this basis the crude product was stirred vigorously with a solution of 12 g. of sodium bicarbonate (twice that amount necessary to neutralize 9 g. of dinitropropane) in 150 ml. of water for 6 hours at room temperature. Extraction with methylene chloride gave 15.4 g. of liquid which according to titration still contained about 5% by weight of dinitropropane. This material was dissolved in 300 ml. of petroleum ether (30–60° C.) and the solution passed through a 2 cm. x 35 cm. column of activated alumina. The acidic impurities were retained in a bright yellow band 8 cm. in length at the top of the column. Elution with 800 ml. of petroleum ether (30–60° C.) did not shift the position of this band to any degree. Removal of the solvent from the combined eluates at reduced pressure left 13.1 g. of neutral, pale yellow oil. Distillation at room temperature 25 mm. in a Hickman still gave 11.5 g. of colorless 1,1,1-trinitropropane.

EXAMPLE V

To a stirred, chilled solution of 26 g. (0.175 M) of 1,1-dinitrobutane in 200 ml. of methyl alcohol was added slowly 44.2 ml. of 3.96 N aqueous sodium hydroxide. The reaction was exothermic and the temperature was kept below 10° C. during the addition by external cooling. The resulting yellow solution had a pH of 9. Tetranitromethane, 34.3 g. (0.175 M), was added and the resulting solution was allowed to stand at room temperature for three days. The pH dropped to 5 during this time. The solution was poured into 1 liter of water and the colorless oil which separated was extracted with methylene chloride and the extract washed with saturated sodium chloride solution and dried over sodium sulfate. Removal of the solvent left 29.40 g. of an acidic yellow liquid. On the basis of the results of a titration and the assumption that the acidity was due mostly to the presence of unchanged dinitrobutane the oil was stirred at room temperature for 4.5 hours with a solution containing a 50% excess of sodium bicarbonate in water. Extraction with methylene chloride gave 17.8 g. of an orange oil which was still acidic. This was kept at room temperature at 0.13 mm. for 3 hours until the volatile components which distilled over maintained a refractive index of $n_d$=1.4397 at 23° C. The residue, 13.5 g., was dissolved in 500 ml. of petroleum ether (30–60° C.) and 100 g. of activated alumina was added. The mixture was stirred occasionally over a 3 hour period, and the alumina filtered off. The 9.5 g. of non-acidic oil obtained from the filtrate was distilled at room temperature at 1 mm. Four fractions were obtained. The last two fractions had the same refractive index $n_d$=1.4406 at 26° C. and were combined to give a total weight of 7.28 g. of 1,1,1-trinitrobutane.

EXAMPLE VI

To a stirred, chilled solution of 22.20 g. (0.15 M) of 2-methyl-1,1-dinitropropane in 150 ml. of methyl alcohol was added a solution of 6.0 g. (0.15 M) of sodium hydroxide in 36 ml. of water. Some of the sodium salt precipitated, and the pH of the mixture was about 9. To this stirred mixture was added 29.4 g. (0.15 M) of tetranitromethane, and after stirring for one hour, an orange solution resulted which had a pH of about 4. After standing at room temperature two days the solution was drenched with water and 26.5 g. of pale yellow oil having a slight tetranitromethane odor was isolated in the usual manner. Since the titration showed this oil to contain about 32% by weight of unchanged dinitro starting material, it was stirred vigorously with a large excess of sodium bicarbonate in aqueous solution to remove most of the acidic impurities. This process left 21.0 g. of liquid which was still acidic. It was treated with 200 g. of activated alumina in petroleum ether (30–60° C.) with occasional stirring over a 3 hour period.

The alumina was filtered off and the solvent removed from the filtrate under reduced pressure to give 12.8 g. of non-acidic residual oil. This product was distilled and the fraction boiling at 33° C./0.35 mm. was collected. Its weight was 8.46 grams. Calculated for 2-methyl-1,1,1-trinitropropane, $C_4H_7N_3O_6$: C, 24.90; H, 3.65; N, 21.75. Found: C, 24.05, 25.05; H, 3.72, 3.66; N, 20.82, 21.03.

EXAMPLE VII

To a stirred, chilled solution of 81 g. (0.50 M) of 1,1-dinitropentane in 400 ml. of methyl alcohol was added a solution of 20 g. (0.50 M) of sodium hydroxide in 100 ml. of water. Some sodium salt precipitated, and the yellow mixture had a pH of about 9. To this stirred mixture was added 108 g. (0.55 M) of tetranitromethane, resulting in a deep red solution having a pH of about 7. The solution was allowed to stand 5 days at room temperature, during which time a considerable amount of heavy oil had separated, the color had become lighter, and the pH had dropped to about 5. After drenching the solution with water, 104 g. of crude product was isolated by the usual method. This material was kept at a bath temperature of 50° C./18 mm. pressure for 5 hours to remove a major portion of the unreacted tetranitromethane. This residue weighed 83 g. and, on the basis of a titration, contained about 34 g. (0.21 M) of unchanged dinitropentane. Most of the unchanged dinitro derivative was separated as its potassium salt from ether. A 10% excess of potassium hydroxide in methanol was used. After filtering off the yellow poassium salt and removing the solvent from the filtrate there was left 48.1 g. of yellow oil which was still acidic. This material was distilled and the fraction boiling at 54–58° C./1.20 mm. was collected. It weighed 29.2 g. and, since it was still slightly acidic, was treated with 85 g. of activated alumina in methylene chloride. The oil obtained weighed 27.1 g. and was non-acidic. It was distilled and the fraction boiling at 50–50.5° C./0.70 mm. was collected. It weighed 22.5 g. and was colorless. Since the elemental analysis for nitrogen was 1.5% lower than that calculated for 1,1,1-trinitropentane, this product was again treated with activated alumina, and finally distilled in a Hickman still at room temperature at $20\mu$ pressure. Two fractions were arbitrarily collected. The second of these was analyzed. Calculated for $C_5H_2N_3O_6$, 1,1,1-trinitropentane: C, 28.99; H, 4.38; N, 20.29. Found: C, 29.62, 29.59; H, 4.22, 4.19; N, 19.68, 19.90.

EXAMPLE VIII

To a stirred, chilled solution of 71.5 g. (0.44 M) of 3-methyl-1,1-dinitrobutane in 220 ml. of methyl alcohol was added a solution of 17.6 g. (0.44 M) of sodium hydroxide in 55 ml. of water. To the resulting mixture was added 60.0 g. (0.31 M) of tetranitromethane. A deep red color developed immediately. The reaction mixture was allowed to stand at room temperature for 15 days during which time the color became yellow. The solution was drenched with water and 72 g. of oil was isolated in the usual manner. It was kept at 50° C./20 mm. for 3 hours, leaving 64 g. of residual oil which contained about 34 g. of unreacted dinitro derivative, according to the results of a titration. The unchanged dinitro compound was removed as its potassium salt by treating a solution of the crude oil in ether with a slight excess of methanolic potassium hydroxide. Removal of the solvent from the filtrate left 19.0 g. of orange oil which was still acidic. A solution of this material in 300 ml. of methylene chloride was passed through a 2 cm. x 40 cm. column of activated alumina. The diluted oil from this treatment weighed 18.0 g. and was non-acidic. It was distilled through a small Vigreaux column and the colorless fraction boiling at 24° C./$10\mu$ was collected. It weighed 7.65 grams. Calculated for 3-methyl-1,1,1-trinitrobutane, $C_5H_9N_3O_6$: C, 28.99; H, 4.38; N, 20.29. Found: C, 29.63; H, 4.22; N, 20.11.

EXAMPLE IX

To a stirred, chilled solution of 60 g. (0.34 M) of 1,1-dinitrohexane in 190 ml. of methyl alcohol was added a solution of 13.7 g. (0.34 M) of sodium hydroxide in 45 ml. of water. Some yellow salt separated. To this mixture was added 46.6 g. (0.24 M) of tetranitromethane. A deep red color developed immediately, and a slight temperature rise was noted. After 7 days at room temperature, during which the color had changed back to yellow and a heavy oil had separated, the mixture was worked up in the usual manner to give 63.5 g. of yellow liquid. On the basis of a titration there was about 25 g. of dinitrohexane in the crude product. The unchanged dinitro compound was removed as its potassium salt by treating a solution of the crude oil in ether with a slight excess of methanolic potassium hydroxide. The salt was filtered off and washed with ether, and the combined filtrate plus washings was washed with saturated sodium chloride solution and dried over sodium sulfate. An experiment in which a small aliquot of the ethereal solution was passed through an activated alumina column showed that the acidic impurities were retained on the column. Consequently the entire ethereal solution was treated in the same fashion. A 2 cm. x 40 cm. alumina column was used, and only the upper portion turned yellow. Even after ether elution, this band had not changed its position appreciably. The lower part of the column was white. Removal of the ether solvent under reduced pressure left 36.4 g. of orange oil. An attempt to distill the material through a small Vigreaux column at a pot temperature of 50° C./$1\mu$ resulted in only a 3.0 g. forerun being obtained. The remainder would not distill further through the column under these conditions. However, distillation was satisfactorily accomplished in a Hickman still at a pot temperature of 40° C./0.2 mm. The distillate was a pale yellow, slightly acidic oil weighing 24.5 g. Since elementary analyses of this product were about 2% divergent from the calculated amounts of carbon and nitrogen in trinitrohexane, the above product was further purified by passing its solution in petroleum ether (30–60° C.) through a 2 cm. x 40 cm. column of activated alumina. A small yellow band was developed at the top of the column. After elution of the column with petroleum ether (30–60° C.) and removal of the solvent under reduced pressure, there was obtained 18.2 g. of non-acidic oil. This was finally distilled through a small Vigreaux column at 0.55 mm. pressure. A small forerun, plus three fractions boiling from 74° to 76.5° C. were obtained. The refractive indices of the three fractions were identical, and so they were combined to give a total weight of 11.40 grams. Calculated for 1,1,1-trinitrohexane, $C_6H_{11}N_3O_6$: C, 32.58; H, 5.01; N, 19.00. Found: C, 33.44, 33.46; H, 5.14, 5.14; N, 18.39. Further attempts to purify this product did not result in a closer agreement between the found analyses and the calculated carbon, hydrogen and nitrogen content of trinitrohexane.

EXAMPLE X

To a solution of 19.0 g. (0.117 M) of 2,2-dimethyl-1,1-dinitropropane in 70 ml. of methyl alcohol was added dropwise, with chilling, a solution of 4.65 g. (0.117 M) of sodium hydroxide in 15 ml. of water. After stirring the resulting red solution one-half hour at room temperature, 18.5 g. (80% of the theoretical) of tetranitromethane was added dropwise (10 min. for addition). Ten minutes after the addition, the reaction became exothermic and the temperature rose to 38° C. No cooling was required, however, and the solution was left at room temperature for two days. The reaction mixture was drenched with water, extracted with methylene chloride, and the extract washed with water and dried over sodium sulfate. Removal of the solvent left 17.5 g. of a mixture of a pale yellow oil plus waxy white crystals. This product was taken up in 500 ml. of petroleum ether (30–60° C.) and the solution passed through six successive activated alumina columns 2 cm. x 30 cm. The first column developed an intense orange band 2 cm. long at the top. The remainder of this column and the entire length of the second, third, fourth, and fifth columns were intensely yellow. The last column developed a very pale yellow color throughout. Elution of the column with more petroleum ether (30–60° C.) did not alter the positions of the bands appreciably. Removal of the solvent left 5.5 g. of yellow, semi-crystalline product. This was sublimed in ten successive portions to give 4.5 g. of non-acidic, white, waxy crystals having a melting point of 139–141° C. A small sample of this was resublimed twice to give a waxy product. Calculated for 2,2-dimethyl-1,1,1-trinitropropane, $C_5H_9N_3O_6$: C, 28.99; H, 4.38; N, 20.29. Found: C, 29.28, 29.56; H, 4.61, 4.55; N, 18.92, 18.78.

EXAMPLE XI

To a stirred, chilled solution of 6.60 g. (0.040 M) of 1-nitro-3-phenylpropane in 20 ml. of methyl alcohol was added dropwise a solution of 2.27 g. (0.040 M) of sodium methylate in 20 ml. of methanol. With continued stirring and chilling, 7.84 g. (0.040 M) of tetranitromethane was added dropwise. During the first half of the addition, the reaction was quite exothermic. The resulting orange solution was kept at room temperature for 24 hours at the end of which time the color of the mixture was yellow and a considerable amount of precipitate had formed. The mixture was drenched with water and the insoluble oil extracted with methylene chloride. Removal of the solvent and unreacted tetranitromethane at 0.2 mm. left 6.61 g. of yellow acidic oil. On the basis of a titration and the assumption that the acidity was due principally to the presence of 1,1-dinitro-3-phenylpropane, this oil contained about 5 g. of the latter compound. A solution of the crude material in 26 ml. of ethyl alcohol was treated with that amount of methanolic potassium hydroxide required to neutralize the acid dinitro derivative. After chilling, the yellow salt which separated was filtered off, dissolved in water, and the yellow solution acidified with acetic acid. A colorless oil separated which on chilling and scratching, slowly crystallized. The weight of the white crystals was 1.40 g. and the melting point was 34–36° C. A mixed melting point with 1,1-dinitro-3-phenylpropane, prepared by oxidative nitration of 1-nitro-3-phenylpropane, showed no depression. The yield was 16.7% of that calculated.

EXAMPLE XII

Example XI was repeated, except that twice as much sodium methylate and 1.5 times as much tetranitromethane were used. The yield of 1,1-dinitro-3-phenylpropane was 2.65 g. or 31.6% of that calculated.

EXAMPLE XIII

To a solution of 21.00 g. (0.1 M) of 1,1-dinitro-3-phenylpropane in 100 ml. of methanol was added dropwise 29.0 ml. of 3.450 N aqueous sodium hydroxide (0.1 M). Some sodium salt separated. After stirring ½ hour, 19.60 g. (0.1 M) of tetranitromethane were dropped in. After about 1.5 hours the sodium salt had dissolved in a deep orange solution, which was stirred for 24 hours at room temperature. A considerable amount of oil had separated during this time. The reaction mixture was drenched with water and the oil extracted with methylene. The unreacted tetranitromethane was distilled off at 40° C. and 0.2 mm. into a Dry-Ice chilled receiver. The residue was dissolved in 20 ml. of petroleum ether (30–60° C). The resulting solution was chilled at −10° C. until no further crystallization occurred. The mother liquor was decanted and the crystals washed with 5 ml. of petroleum ether (30–60° C.) at −10° C. and filtered. The combined filtrate and washer was passed through a 1 x 12 cm. silicic acid column, to give a pale yellow band 3.5 cm. long at the top of the column. The column was eluted with a 10% solution by volume of methylene chloride in petroleum ether (30–60° C.) until the yellow band had moved down to within 1 cm. of the bottom. Removal of the entire filtrate left a yield of 1,1,1-trinitro-3-phenylpropane of 7.14 g., (28%); M.P. 35–36° C.

From the foregoing detailed description it may be seen that there had been disclosed a new and useful process for the preparation of polynitro hydrocarbons. Utilizing this process several new and useful dinitro and trinitro substituted hydrocarbons have been prepared. These compounds because of their structure have an unusually large proportion of oxygen and represent an entirely new series of explosives. Their properties vary with the length of the carbon chain. The longer the chain the less powerful and less sensitive the compound becomes. Many of these compounds are liquids at room temperature, and as such they form a class of liquid high explosives the sensitivity and power of which may be adjusted to the need at hand. All of them are much less sensitive than nitroglycerin. They also avoid the objectionable freezing point of the nitroglycerin while remaining superior to it in storage life. They may be used as substitutes for an equal amount of nitroglycerin in the manufacture of blasting gelatins and dynamites, etc. When three parts by weight of these compounds is absorbed in one part by weight of kieselguhr a dynamite is produced which may be exploded by an engineer special blasting cap and fuze in a manner well known to those skilled in the art. These dynamites are superior to those made with nitroglycerin in that they are less sensitive to shock, there is less danger of their freezing and they have a longer storage life.

The compounds of this invention may also be used in the pure form in the manner well known for the use of nitroglycerine in the "shooting" of oil wells. Because these compounds contain large proportions of oxygen and nitrogen they are useful as ingredients in propellant compositions to increase the burning rate and the gas volume. The incorporation of 30–40% by weight of these compounds into nitrocellulose produces a double base propellant of considerably improved power over that prepared from guncotton alone. Mixed with aluminum they are also useful as underwater explosives because of their high oxygen content. In addition they are useful as additives for hydrocarbon fuels such as diesel fuels to increase the ignitability of those fuels.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A process for the preparation of 1,1-dinitro-3-phenylpropane with tetranitromethane in an alkaline solution.

2. A process for the preparation of 1,1,1-trinitro-3-phenylpropane comprising reacting 1,1-dinitro-3-phenylpropane with tetranitromethane in an alkaline solution.

3. A new chemical compound 1,1,1-trinitro-3-phenylpropane.

4. The process of preparing a polynitro substitution product of benzene which comprises; reacting a compound selected from the group consisting of 1-nitro-3-phenylpropane and 1,1-dinitro-3-phenylpropane with tetranitromethane in an alkaline solution.

No references cited.